United States Patent
Clouser et al.

(10) Patent No.: US 11,047,736 B2
(45) Date of Patent: Jun. 29, 2021

(54) OPTICS TO REDUCE SKEW IN INTEGRATED CAVITY OUTPUT SPECTROSCOPIC DEVICES

(71) Applicant: The University of Chicago, Chicago, IL (US)

(72) Inventors: Benjamin W. Clouser, Chicago, IL (US); Laszlo Sarkozy, Columbus, OH (US); Elisabeth Moyer, Chicago, IL (US)

(73) Assignee: The University of Chicago, Chicago, IL (US)

( * ) Notice: Subject to any disclaimer, the term of this patent is extended or adjusted under 35 U.S.C. 154(b) by 114 days.

(21) Appl. No.: 16/445,612

(22) Filed: Jun. 19, 2019

(65) Prior Publication Data

US 2019/0383663 A1 Dec. 19, 2019

Related U.S. Application Data

(60) Provisional application No. 62/686,828, filed on Jun. 19, 2018.

(51) Int. Cl.
*G01J 3/02* (2006.01)
*G01J 3/42* (2006.01)

(52) U.S. Cl.
CPC .......... *G01J 3/0267* (2013.01); *G01J 3/0216* (2013.01); *G01J 3/42* (2013.01)

(58) Field of Classification Search
CPC .......... G01J 3/0267; G01J 3/0216; G01J 3/42
See application file for complete search history.

(56) References Cited

U.S. PATENT DOCUMENTS

| 9,709,491 B1* | 7/2017 | Murphy | G01J 3/0297 |
| 9,983,126 B2* | 5/2018 | Kotidis | G01J 3/108 |
| 2012/0062895 A1* | 3/2012 | Rao | G01N 33/0037 356/437 |
| 2012/0113426 A1* | 5/2012 | Rao | G01N 21/39 356/437 |
| 2017/0059477 A1* | 3/2017 | Feitisch | G01N 21/274 |
| 2018/0013016 A1* | 1/2018 | Englund | H01L 31/02325 |
| 2018/0252641 A1* | 9/2018 | Vasudev | G01N 21/031 |
| 2019/0128799 A1* | 5/2019 | Leen | G01N 21/359 |

(Continued)

FOREIGN PATENT DOCUMENTS

CN 2414387 Y * 1/2001

OTHER PUBLICATIONS

English Machine translation of CN2414387Y (Year: 2001).*

(Continued)

*Primary Examiner* — Dominic J Bologna
(74) *Attorney, Agent, or Firm* — Bell & Manning, LLC

(57) ABSTRACT

An integrated cavity output spectroscopic (ICOS) device includes a cavity and a mirror positioned at an output end of the cavity. The ICOS device also includes a first collection lens positioned between a detector and the mirror at the output end of the cavity, and a second collection lens positioned between the first collection lens and the detector. The ICOS device further includes an optical component configured to reduce skew of an optical signal output from the cavity, where the optical component is positioned between the mirror and the first collection lens.

18 Claims, 12 Drawing Sheets

(56) References Cited

U.S. PATENT DOCUMENTS

2019/0317018 A1* 10/2019 Kobayashi ......... G01N 21/3504

OTHER PUBLICATIONS

J. B. Paul et al., "Ultrasensitive absorption spectroscopy with a high-finesse optical cavity and off-axis alignment," Appl. Opt. 40, 4904-4910 (2001).

J. Hodgkinson et al., "Optical gas sensing: a review," Meas. Sci. Technol. 24, 012004 (2013).

A. O'Keefe et al., "Cavity ring-down optical spectrometer for absorption measurements using pulsed laser sources," Rev. Sci. Instrum. 59, 2544-2551 (1988).

A. O'Keefe, "Integrated cavity output analysis of ultra-weak absorption," Chem. Phys. Lett. 293, 331-336 (1998).

R. Engeln, et al., "Cavity enhanced absorption and cavity enhanced magnetic rotation spectroscopy," Rev. Sci. Instrum. 69, 3763-3769 (1998).

D. Herriott et al., "Off-axis paths in spherical mirror interferometers," Appl. Opt. 3, 523-526 (1964).

Y. A. Bakhirkin et al., "Mid-infrared quantum cascade laser based off-axis integrated cavity output spectroscopy for biogenic nitric oxide detection," Appl. Opt. 43, 2257-2266 (2004).

D. S. Sayres et al., "A new cavity-based absorption instrument for detection of water isotopologues in the upper troposphere and lower stratosphere," Rev. Sci. Instrum. 80, 044102 (2009).

D. S. Sayres et al., "Arctic regional methane fluxes by ecotope as derived using eddy covariance from a low-flying aircraft," Atmos. Chem. Phys. 17, 8619-8633 (2017).

R. Provencal et al., "Cavity-enhanced quantum-cascade laser-based instrument for carbon monoxide measurements," Appl. Opt. 44, 6712-6717 (2005).

M. McCurdy et al., "Quantum cascade laser-based integrated cavity output spectroscopy of exhaled nitric oxide," Appl. Phys. B 85, 445-452 (2006).

W. Zhao et al., "Wavelength modulated off-axis integrated cavity output spectroscopy in the near infrared," Appl. Phys. B 86, 353-359 (2007).

D. Marchenko et al., "A compact laser-based spectrometer for detection of $C_2H_2$ in exhaled breath and HCN in vitro," Appl. Phys. B 118, 275-280 (2015).

D. Baer, J. et al., "Sensitive absorption measurements in the near-infrared region using off-axis integrated-cavity-output spectroscopy," Appl. Phys. B 75, 261-265 (2002).

H. Jia et al., "Absorption spectroscopy of ammonia between 6526 and 6538 cm-1," J. Quantum Spectrosc. Radiat. Transfer 110, 347-357 (2009).

G. S. Engel et al., "Ultrasensitive near-infrared integrated cavity output spectroscopy tecnnique for detection of co at 1.57 μm: new sensitivity limits for absorption measurements in passive optical cavities," Appl. Opt. 45, 9221-9229 (2006).

D. Sonnenfroh et al., "Diode laser-based sensor for high precision measurements of ambient $CO_2$ in network applications," Appl. Phys. B 102, 407-416 (2011).

Z. Tan et al., "Off-axis integrated cavity output spectroscopy and its application," Opt. Commun. 283, 1406-1409 (2010).

V. Kasyutich et al., "Cavity-enhanced absorption: detection of nitrogen dioxide and iodine monoxide using a violet laser diode," Appl. Phys. B 76, 691-697 (2003).

R. D. J. Connolly et al., Specifications of Raytran Material (1979).

E. Moyer et al., "Design considerations in high-sensitivity off-axis integrated cavity output spectroscopy," Appl. Phys. B 92, 467-474 (2008).

* cited by examiner

FIG. 4

| Calculation | $D_1$ | $D_2$ | $D_3$ | $D_4$ |
|---|---|---|---|---|
| No Nonax | NA | 16.50 | 75.00 | 83.01 |
| Design Nonax | 12.66 | 29.16 | 87.66 | 95.67 |
| Manufactured Nonax | 12.66 | 29.16 | 87.66 | 96.31 |

FIG. 6

| Component | $R_1$ | $R_2$ | Diam. | CT | Material |
|---|---|---|---|---|---|
| M1 | plano | 1496.3 | 112 | 25.4 | Infrasil 302 |
| M2 | -1496.3 | plano | 112 | 25.4 | Infrasil 302 |
| Nomax | plano | plano | 110 | 7.65 | ZnSe |
| PCX1 | 119.9 | plano | 112 | 16.36 | ZnSe |
| PCX2 | 71.46 | plano | 38.1 | 4.586 | ZnSe |
| Detector | plano | NA | 2.0 | NA | InAs |

FIG. 10

OPTICS TO REDUCE SKEW IN INTEGRATED CAVITY OUTPUT SPECTROSCOPIC DEVICES

CROSS-REFERENCE TO RELATED APPLICATION

The present application claims the priority benefit to U.S. Provisional Patent Application No. 62/686,828 filed on Jun. 19, 2018, the entire disclosure of which is incorporated by reference herein.

BACKGROUND

Integrated Cavity Output Spectroscopy (ICOS) is an absorption spectroscopy technique in which light is injected off-axis into a cavity that includes high-reflectivity mirrors to provide a very long optical path length. For example, a 1 meter (m) cavity with mirror reflectivity of 99.98% will have an effective path length of 5 kilometers (km). ICOS instruments are routinely used to measure trace atmospheric constituents with concentrations as low as parts per trillion, and their relative insensitivity to alignment and environmental vibration make them an attractive choice for measurements in the field. Compact instruments with low cavity volumes and short flush times can yield sampling rates of ~10 hertz. However, since laser light must pass through the cell mirrors to enter the cavity, it is attenuated by a factor of (1-R), making this an inherently low power technique and placing a premium on efficient light collection of the cavity output.

SUMMARY

An illustrative integrated cavity output spectroscopic (ICOS) device includes a cavity and a mirror positioned at an output end of the cavity. The ICOS device also includes a first collection lens positioned between a detector and the mirror at the output end of the cavity, and a second collection lens positioned between the first collection lens and the detector. The ICOS device further includes an optical component configured to reduce skew of an optical signal output from the cavity, where the optical component is positioned between the mirror and the first collection lens.

An illustrative optical component for use in an ICOS device includes a plurality of slices mounted to one another in a circular pattern, where edges of the slices are mounted to one another such that there is a step at each interface between the slices. A first surface of a slice is wedge-shaped such that a gradient of the first surface of the slice points from a first corner of the slice to a second corner of the slice along a cross-section of the slice, and a second surface of the slice is wedge-shaped or plano. Each of the slices is formed to have a wedge angle β to refract skew out of an optical signal received by the optical component.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 4 is a table including details for the various instruments used to obtain the contour plots of FIG. 3 in accordance with an illustrative embodiment.

FIG. 6 is a table depicting information about the optical components used in the ChiWIS ICOS device in accordance with an illustrative embodiment.

FIG. 10 is a table depicting optical component dimensions for a proposed system in accordance with an illustrative embodiment.

DETAILED DESCRIPTION

As discussed above, high effective path lengths and stable optical configuration make Off-Axis Integrated Cavity Output Spectroscopy (OA-ICOS) a useful spectroscopic technique for measuring trace gases. It is noted that the abbreviations ICOS and OA-ICOS are used interchangeably herein. However, the skewed nature of the output ray geometry of ICOS cavities makes it difficult to collect the already weak cavity output onto small detectors and limits the light collection efficiency for compact instrument designs. This constraining effect of skewness in ICOS cavities is derived herein with Herriott alignments. Also described herein is how this constraint can be overcome by addition of a non-axially-symmetric optical component to an ICOS device. The efficacy of this approach is demonstrated using an ICOS-based water isotope spectrometer, which incorporates a skew-correcting optical element that includes two or more ZnSe wedges. In an illustrative embodiment, eight wedges are used, however there is no limit to the number of wedges that can be used. In alternative embodiments, a different type of ICOS spectrometer can be used. As also described herein, the skew-correcting optical element significantly increases collection efficiency of the system.

Figure 1:
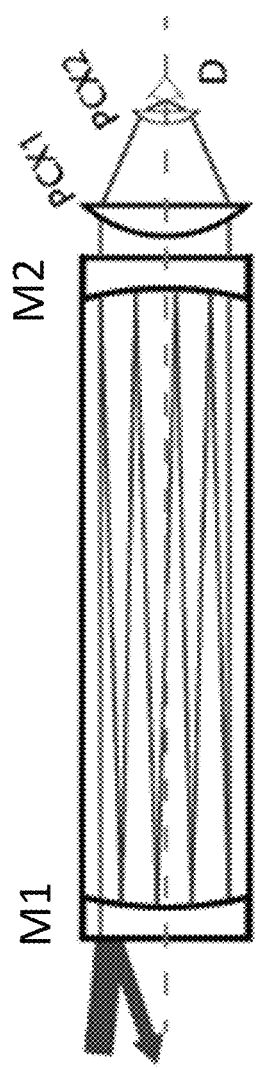
FIG. 1 depicts an optical layout of an ICOS cavity and its collection optics in accordance with an illustrative embodiment.

FIG. 1 depicts an optical layout of an ICOS cavity and its collection optics in accordance with an illustrative embodiment. As shown, the ICOS cavity includes two identical cell mirrors labelled M1 and M2, two plano-convex collection lenses labelled PCX1 and PCX2, and a detector labelled D. In the ICOS cavity of FIG. 1, most power is reflected away before it enters the cavity, making ICOS a low power technique. All optics used in the ICOS cavity of FIG. 1 are axially symmetric and share the same optical axis, represented by the dashed line.

Figure 2:
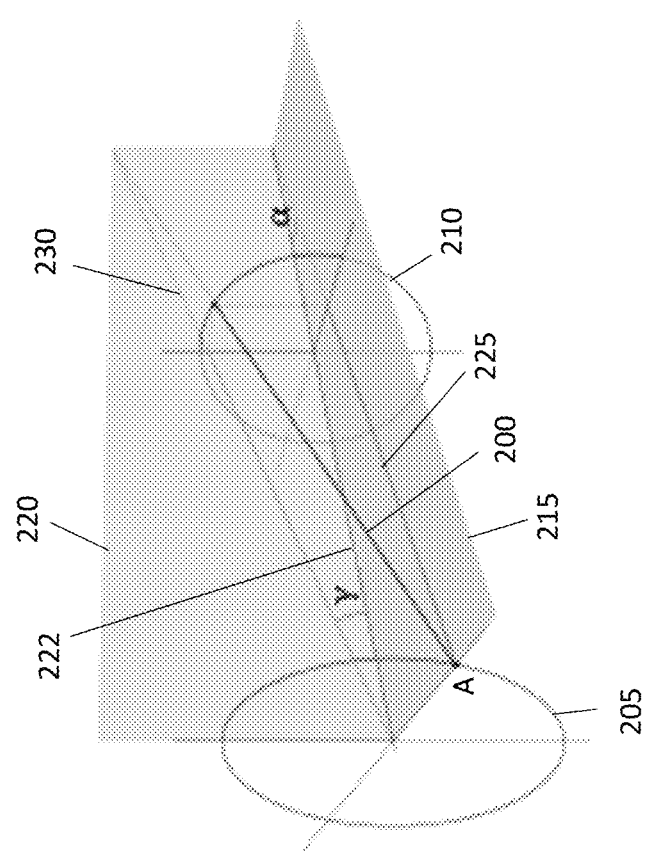
FIG. 2 is a diagram depicting divergence and skew in an ICOS cavity in accordance with an illustrative embodiment.

As known in the art, ICOS cells are typically aligned with a circular Herriott pattern, in which beam paths are innately divergent and skewed. For an axially symmetrical optical system with off-axis alignment, the divergence of the beam is its component that is co-planar with the optical axis, and the skewness is the component that is not co-planar with the optical axis. FIG. 2 is a diagram depicting divergence and skew in an ICOS cavity in accordance with an illustrative embodiment. As shown in FIG. 2, a ray 200 propagates from a first mirror 205 to a second mirror 210. A tangential plane 215 and a plane 220 are depicted such that divergence and skew can be visualized. The tangential plane 215 is a plane containing an optical axis 222 and the object point, and a divergence angle α is the angle between the optical axis 222 and a projection (or divergence ray) 225 of the ray 200 into the tangential plane 215. The plane 220 is perpendicular to the tangential plane 215 and also contains the optical axis 222. A skew angle γ is the angle between the optical axis 222 and a projection (or skew ray) 230 of the ray 200 into the plane 220.

Divergence can be readily handled by standard optical components, but skewness cannot be completely removed by axially symmetric lenses. Skewness may be an advantage for Herriott cells by allowing for greater separation between cavity input and output beams and their associated optics. However, skewness is a detriment in ICOS cells in which light does not exit the cell through a single aperture, but through all points on the Herriott pattern. For ICOS, skewness places strict lower limits on how focused a cavity output can be and therefore hinders light collection. Due to the limited sizes of commercially available detectors, this constraint can limit output collection efficiency for ICOS instruments.

In direct analogy to angular momentum and central forces, skewness is conserved by axially symmetric optics, and the skew invariant remains unchanged under any interactions with axially symmetric components. This relationship is demonstrated by Equation 1 below:

$$h = nS \sin \gamma \qquad \text{Equation 1}$$

In Equation 1, n is the index of refraction of the medium, S is the minimum distance between the skew ray and the optical axis, and γ is the skew angle between the skew ray and the optical axis evaluated at that point. Interaction with axially symmetric components can only trade between S and sin γ, and it can be seen that h/n is the theoretical minimum approach a skew ray can make to the optical axis.

As depicted in FIG. 1, in ICOS instruments the cavity mirrors and collection optics typically share the same optical axis. As a result, the Herriott reentrant conditions of the cavity define a skew invariant for the whole system. The skew and divergence angles are identical for every output ray in the circular Herriott spot pattern, so for this geometry the skew invariant h defines the minimum radius to which a mirror spot pattern can be focused by axially symmetric optics.

In an optical cavity aligned in a reentrant Herriott pattern, the skew angle is fully determined by two dimensionless cavity geometry parameters. The Herriott pattern is set by u=f/d, the ratio of mirror focal length to mirror separation, and the cavity aspect ratio is described by v=A/d, the ratio of Herriott pattern radius to mirror separation. Equation 1 can therefore be written in terms of these cavity geometry numbers. In an illustrative embodiment, the relevant skew angle can be referred to as $\gamma_w$, which is the skew angle at the Herriott beam pattern waist halfway between the mirrors. The value of $\gamma_w$ can be determined by starting from the Herriott reentrant conditions and calculating the direction of the ray. In cylindrical coordinates and at the point of the ray's closest approach to the optical axis (i.e., after it has advanced halfway through the cell) the direction unit vector $\hat{x}$ has the form:

$$\hat{x} = \frac{1}{\sqrt{1 + \frac{v^2}{u}}} \left(0, \pm \frac{v}{\sqrt{u}}, 1\right) \qquad \text{Equation 2}$$

From Equation 2, the divergence angle at the pattern waist can be identified as $\alpha_w = 0$, and the skew angle as:

$$\gamma_w = \arctan\left(\pm \frac{v}{\sqrt{u}}\right) \qquad \text{Equation 3}$$

The ± sign here corresponds to cells with clockwise and counter-clockwise alignments, respectively, as viewed from the input side of the cell. The remaining variables in Eq. 1 (n and S) can be readily calculated or assumed. A ray's closest approach to the optical axis in the cavity occurs halfway between the mirrors at the beam pattern waist, and that distance is given by $S = A\sqrt{1 - 1/4u}$. Additionally, ICOS cavities are typically filled with low pressure air, so n=1 can be used. From these and Equation 3, the cavity skew invariant is given by:

$$h = S \sin \gamma_w = A \left(\frac{v\sqrt{1 - \frac{1}{4u}}}{\sqrt{v^2 + u}}\right) \qquad \text{Equation 4}$$

Figure 3:
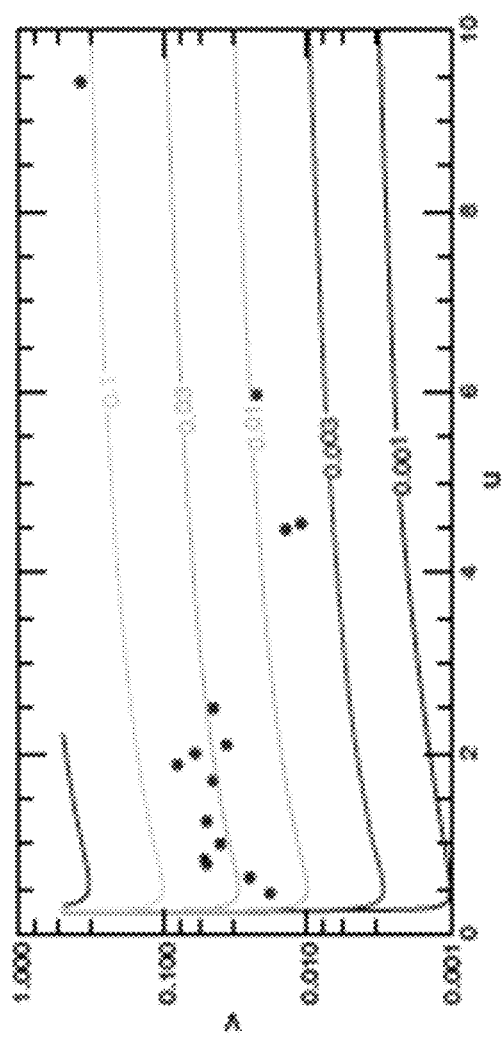
FIG. 3 depicts the contours of h/A as a function of u and v, along with the values from various ICOS instruments in accordance with an illustrative embodiment.

The cavity geometry parameters therefore provide insight into how relevant skew may be for instrument design. FIG. 3 depicts the contours of h/A as a function of u and v, along with the values from various ICOS instruments in accordance with an illustrative embodiment. More specifically, FIG. 3 depicts a contour plot showing h/A plotted against the dimensionless cavity geometry numbers u=f/d and v=A/d, where h is the skew invariant, f is the focal length of the mirrors, and d is separation distance between mirrors. Larger values of the skew angle γ result in larger skew invariants for a given Herriott pattern radius A. The A/d ratio is a much stronger control on skewness than changes in u. It is noted that Herriott cell solutions exist only for u>0.25 (i.e. d/f<4). In FIG. 3, a black asterisk marks results from the proposed system.

Figure 4:
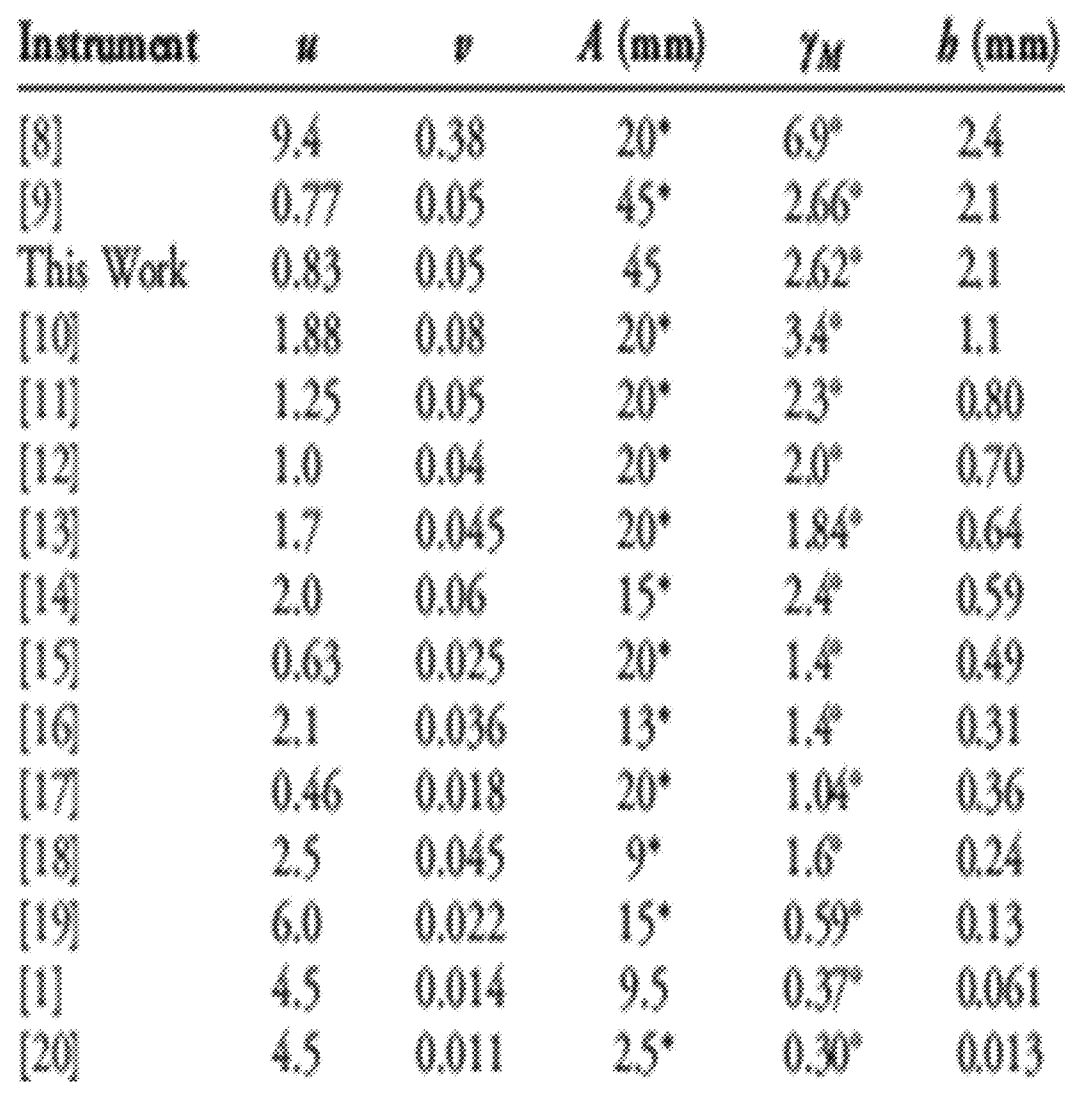

The parameter h/A can be thought of as a concentration factor describing how strongly a circular Herriott pattern can be focused onto a detector. Two features are readily evident from FIG. 3. First, the cavity aspect ratio v=A/d is a much stronger control on the concentration factor than is u. Second, most ICOS instruments cluster within a relatively small range of parameter space, producing very similar concentration factors (h/A≈0.03). In this design regime, concerns about collection efficiency will scale with A and also with instrument size. FIG. 4 is a table including details for the various instruments used to obtain the contour plots of FIG. 3 in accordance with an illustrative embodiment. In FIG. 4, values of A with an asterisk are estimated from other quantities in the given reference, and instruments are listed in order of decreasing h. Also, $\gamma_M$ is the skew angle evaluated at the output mirror face.

Instruments with large A and therefore large skew invariants, such as this work and instrument [9] from FIG. 4, typically have designs motivated by reducing potential optical noise. Larger-diameter spot patterns minimize overlap of beam spots within the coherence length of the laser, reducing unwanted resonance effects. These constraints are generally strongest for the longer wavelength instruments, whose diffraction-limited spot sizes are larger than those for instruments operating in the near infrared (IR). A second class of instruments susceptible to large skew angles are those that are extremely compact and low-volume. In these cases d is made very small, while A is constrained by optical resonance considerations, and A/d can become very large. The instrument with the highest skew invariant in FIG. 4 is instrument [8], and it falls into this category. The instrument [8] is a breath analyzer only 5.3 centimeters (cm) in cavity length. As the ICOS technique is more widely adopted in lightweight and portable instruments, skewness may become an increasingly important design consideration.

If design constraints mandate a skew invariant so large that light collection is limited, better focus can be achieved by using optical components that are not axially symmetric. Such components break the symmetry of the output and do not require skewness to be conserved, and can gainfully exploit the symmetry of the Herriott pattern. Described herein is a non-axially symmetric optical component designed for the water isotope spectrometer such as the Chicago Water Isotope Spectrometer (ChiWIS), which is operated at mid-infrared. In alternative embodiments, a different type of ICOS device may be used. As also discussed herein, the proposed designs allow skewed output rays to be imaged onto the optical axis and results in an approximately three-fold improvement in light collection.

In designing collection optics to mitigate and correct skewness associated with ICOS systems, the relevant skew angle to consider is that at the output mirror face, $\gamma_M$. This angle can be calculated by transforming the Herriott reentrant conditions as discussed above, yielding:

$$\gamma_M = \arctan\left(\pm \frac{v}{2u}\sqrt{4u-1}\right) \qquad \text{Equation 5}$$

This value is given in the table of FIG. 4. The divergence angle at the mirror face is given by $$\alpha_M = \arctan\left(\frac{v}{2u}\right).$$

Figure 5:
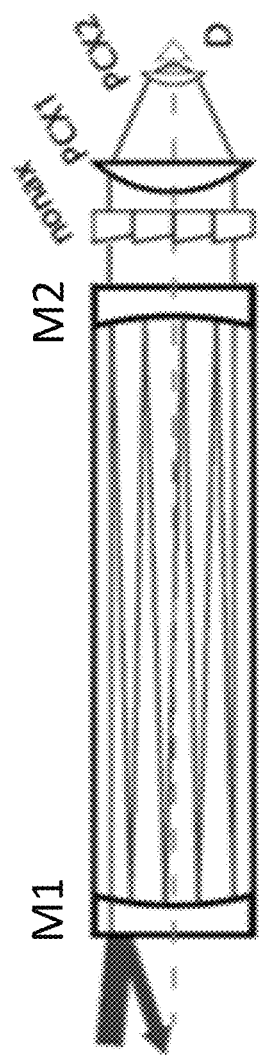
FIG. 5 is a schematic of an ICOS device cell with an optical component to reduce skew in accordance with an illustrative embodiment.

In one embodiment, the proposed ICOS device can operate in mid-infrared and include large (e.g., 112 mm) diameter cavity mirrors. To correct the skewness inherent in the Herriott pattern of such an ICOS device, an optical component composed of eight, identical slices (or wedged windows) was designed. In one embodiment, the slices can be manufactured in the shape of pizza slices, then glued together and assembled into a mount. FIG. 5 is a schematic of an ICOS device cell with an optical component to reduce skew in accordance with an illustrative embodiment. As shown in FIG. 5, the optical component (or nonax) is placed between the cavity output mirror M2 and the larger plano-convex (PCX1) collection lens where the output rays are nearly paraxial. The slope of the wedged surface of the optical component is such that it corrects most of the cavity output skewness, allowing the output to be focused into a much smaller area. More specifically, the optical component refracts out most of the skewness in the rays before they are focused down to the optical axis. The mirrors M1 and M2 can be spherical mirrors, spherical astigmatic mirrors, parabolic mirrors, elliptical mirrors, etc. Also, the systems described herein are not limited to the configuration of FIG. 5. For example, smaller instruments may utilize a single lens and/or a focusing mirror such as an off-axis parabolic mirror. The optical components described herein can be used with such configurations as well as the configuration of FIG. 5. Additionally, the optical component can be designed to go after either of the lenses in FIG. 5. However, the angle of incidence of rays onto the optical component will be shallowest immediately after the second mirror, which means refractive surfaces can be shallower as well, which makes for easier design and cheaper manufacture.

The geometry of the ChiWIS ICOS device results in a skew invariant of h≈2.1 mm, mainly due to its large spot pattern, which was a result of its relatively long target wavelength of ~2.647 microns. This wavelength was chosen to measure $H_2O$ and HDO spectral features, and also because it interacts strongly with OH impurities in glass. To achieve this, high-purity optical materials such as Infrasil and ZnSe can be used to fabricate the ICOS device components. Alternatively, materials such as Silicon, Germanium, AMTIR-1, AMTIR-2, GASIR-1, CdTe, ZnS, $BaF_2$, $CaF_2$, $MgF_2$, calcite, sapphire, chalcogenide glasses (such as BD-2, IG2, and IG6), fused silica, quartz glass, crystal quartz, Schott Glasses (such as BK7, SF11, LaSFN9, BaK1, and F2, amongst others), crown glasses, flint glasses, etc. can also be used. The cavity mirrors were 902.02 mm apart, and the collection optics include the non-axially symmetric optical component (nonax), two ZnSe PCX lenses, and a 2 mm diameter InAs Judson detector (J12TE3-66D-R02M). In alternative embodiments, a different detector and/or different dimensions may be used. The detector chip is packaged in a can with field-of-view of about 65°, which limits the angle of incidence (AOI of light onto the detector. Limited AOI onto the detector chip means that in practical terms the minimum spot size h shown in FIG. 4 cannot be achieved. FIG. 6 is a table depicting information about the optical components used in the ChiWIS ICOS device in accordance with an illustrative embodiment.

Figure 7:
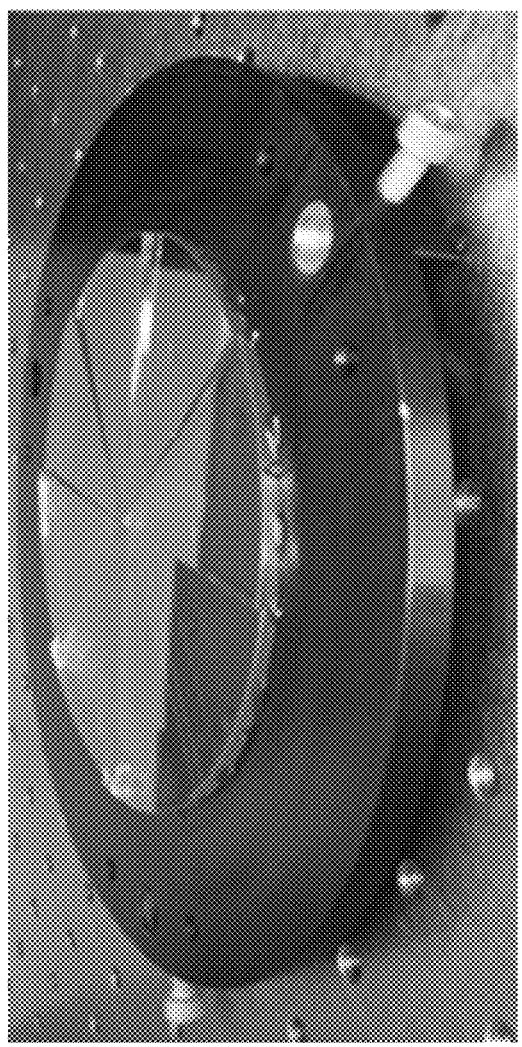
FIG. 7 depicts an assembled non-axially symmetric optical component mounted in a mounting ring in accordance with an illustrative embodiment.

FIG. 7 depicts an assembled non-axially symmetric optical component mounted in a mounting ring in accordance with an illustrative embodiment. In one embodiment, the mounting ring can be anodized Aluminum. In alternative embodiments, a different material may be used to form the mounting ring such as an aluminum alloy, a steel alloy, stainless steel, etc. depending on the specific requirements of the instrument being developed. The view angle of FIG. 7 shows the steps at the interfaces between individual slice elements (slices) of the optical component. In an illustrative embodiment, there is a step at each line of contact between the slice elements that form the optical component. In an alternative embodiment, wedges of the optical component may be mounted directly onto the cavity output mirror using an optical adhesive, cement, glue, epoxy, etc. In such an implementation there is no need for an optical mount.

Figure 8:
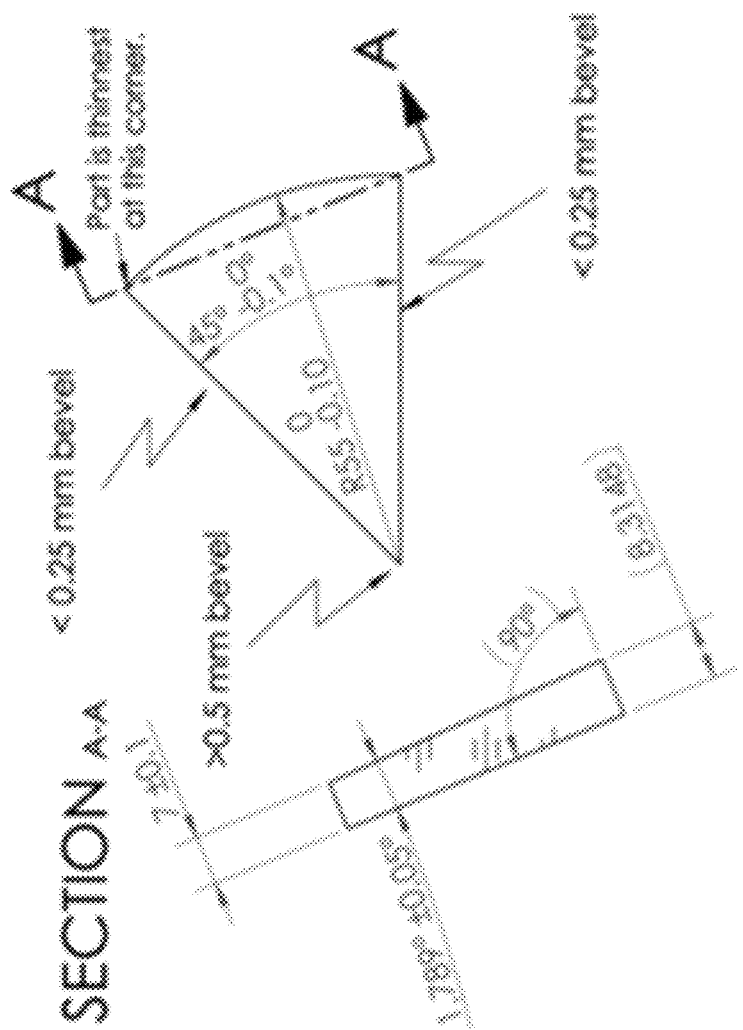
FIG. 8 is a mechanical drawing of a slice in accordance with an illustrative embodiment.

FIG. 8 is a mechanical drawing of a slice in accordance with an illustrative embodiment. In one embodiment, a gradient of the slice element surface points from one corner to the other along cross section A-A shown in FIG. 8. In an alternative embodiment, the gradient can point from one corner of the slice element to the opposing edge. The dimensions of FIG. 8 are in mm.

Figure 9B:
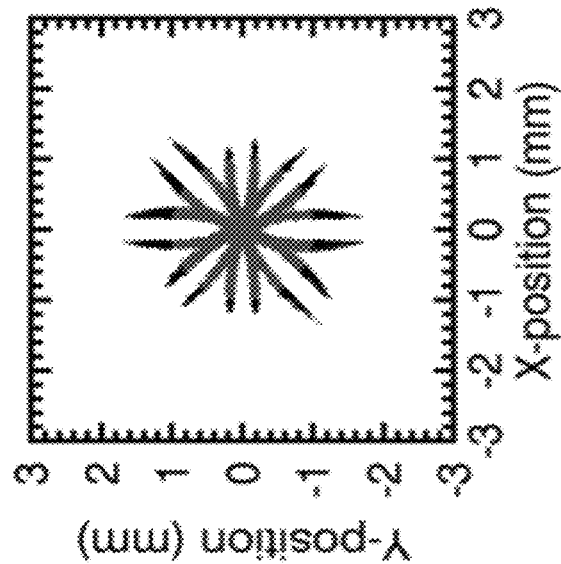
FIG. 9B depicts a calculated spot pattern in a detector plane with the use of an optical component as described herein in accordance with an illustrative embodiment.
Figure 9C:
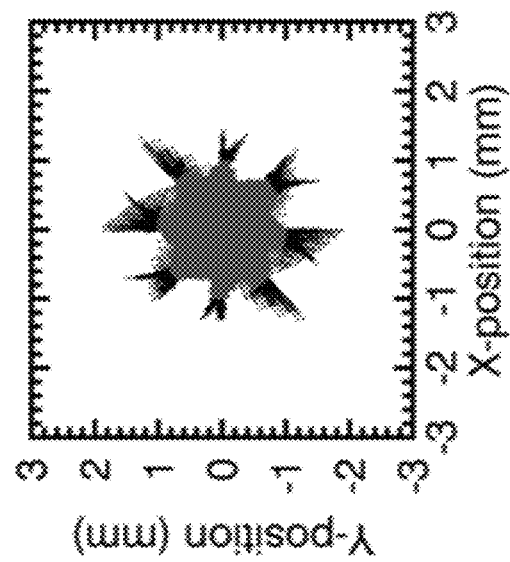
FIG. 9C depicts a calculated spot pattern in a detector plane for a manufactured optical component in accordance with an illustrative embodiment.
Figure 9A:
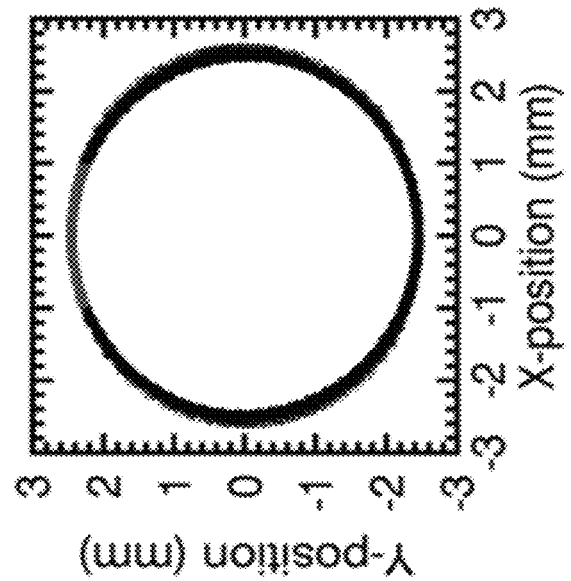
FIG. 9A depicts a calculated spot pattern in a detector plane without use of an optical component in accordance with an illustrative embodiment.

As discussed above, in traditional systems, axially symmetric collection optics can gather only a small portion of the light exiting the cavity. Ray tracing calculations suggest that Herriott alignment results in collection efficiency of only 13%, as shown in FIG. 9A discussed below. The output retains the ring shape of the original Herriott pattern, with minimum focusing diameter of 4.6 mm, much larger than the ICOS devices described herein. Collection efficiency could be slightly increased by aligning the detector face perpendicular to the incoming cavity output, but that adjustment would still result in at best 20% capture. Introducing the designed asymmetric optical element described herein can improve light collection to 93%, as depicted in FIG. 9B.

In an illustrative embodiment, a mathematically perfect un-skewing optic would be a helix. However, it can be very difficult to manufacture a helix. In another embodiment, as discussed above, the optical element can be a design including multiple wedged windows that are cut into the shape of circular sectors (slices). It is found that such an arrangement can closely approximate the ideal optical element. In an alternative embodiment, the optical element can be formed into a ring shape by cutting off the vertex ends of the slices, which can reduce the amount of material used. The ring shape works because most of the optical component is unused due to the fact that OA-ICOS alignments have a nearly circular spot pattern with nearly constant radius and a relatively low filling factor across the face of the cavity mirrors. Once the skew angle of a cavity is known, one can determine the local surface necessary to completely refract out the skewness.

In an illustrative embodiment, a wedged face of each slice of the optical component is positioned closest to (i.e., facing toward) the output mirror and a plano face of each slice of the optical component points away from the output mirror. Assuming the component has its wedged surface facing the cavity output mirror, and that the second surface is plano, perpendicular to the optical axis, and that no refraction in the azimuthal direction occurs there, the wedge angle β necessary to refract out the skew is:

$$\tan\beta = \frac{n_o \sin\gamma_M}{n_1 - n_0 \cos\gamma_M}$$  Equation 6

In Equation 5, $n_1$ is the index of refraction of the wedge material and $n_0$ is the index of refraction of the medium. For an optical element made of ZnSe at 2.64 microns $n_1$=2.4398 $\beta_{ChiWIS}$=1.79°. The wedge angle points the surface normal away from the incoming skew rays, increasing the angle of incidence on the wedged surface. This also implies that a set of wedges has handedness, and should not be used with both clockwise and counter-clockwise cavity output. Materials with high indices of refraction have lower wedge angles and involve less material for manufacture.

In an alternative embodiment, the slices of the optical component could be designed so that the plano faces of each slice point towards the output mirror and the wedged faces of each slice point away. In another alternative embodiment, both faces of the slices of the optical component can be wedged. A most general skew-correcting slice has two wedged surfaces. For example, a first surface can have a wedge angle β and the second surface can have a wedge angle α. Furthermore, it can be assumed that a ray of light with skew angle $\gamma_M$ which interacts with the slice first travels through a medium with index of refraction $n_0$, and then passes through the slice with index of refraction $n_1$, and exits into a medium with index of refraction $n_2$. If the output ray is constrained to be parallel to the optical axis, then α, β, and $\gamma_M$ are related by the following equation:

$$\sin(\alpha+\beta)\sqrt{n_1^2 - n_0^2\sin^2(\beta+\gamma_M)} - n_0\cos(\alpha+\beta)\sin(\beta+\gamma_M) = n_2 \sin\alpha$$  Equation 7

In practice, manufactured slices may have one face perpendicular to the optical axis. This further constraint allows the remaining wedge angle to be written in terms of the skew angle $\gamma_M$. If the first surface is perpendicular to the optical axis, then β=0 and $$\tan\alpha = \frac{n_0\sin\gamma_M}{\sqrt{n_1^2 - n_0^2\sin^2\gamma_M} - n_2}$$  Equation 8

If the second face is perpendicular to the optical axis, then α=0 and $$\tan\beta = \frac{n_0\sin\gamma_M}{n_1 - n_0\cos\gamma_M}$$  Equation 9

In equation 8, $n_2$ does not appear because the first surface refracts out all of the skew, leaving the ray already parallel to the optical axis (and the surface normal to the second face). It is noted that allowing the media from/into which the ray travels to have different indices of refraction allows the equation to encompass the case in which a slice is mounted directly to the cavity output mirror. In that case, $n_0$ is the index of refraction of the mirror substrate and $n_2$ is the index of refraction of air. If the whole slice is surrounded by air, then $n_0$=$n_2$.

In an illustrative embodiment, the slices which form the optical element are designed to perfectly correct the cavity output along their centerline, and leave only 0.17 degrees of residual skew angle along their edges. In alternative embodiments, a different degree of residual skew angle along the edges may be used. When assembled, the net result of the nonax optical component is that each slice directs the section of the cavity output that passes through it onto the optical axis. The points where the arc and the radii of the slices meet are referred to as the corners, and the point where the two radii meet is referred to as the vertex. Each slice is wedged with the angle β calculated above such that the gradient of the wedged surface points from one corner to the other along cross section A-A (FIG. 5, bottom). In another illustrative embodiment, the thickness of the slice at the vertex and along the centerline of the slice is half way between the minimum and maximum thicknesses.

In one embodiment, eight slices can be used to form the optical component. The use of eight slices can be a compromise between increased skew cancellation and increased light interaction with component edges and difficulty of assembly. For example, optical components with two or four wedged slices still allow a significant fraction of the light to miss a 2 mm detector (27% and 53%, respectively). Also, increasing the number of slices beyond 8 results in little improvement due to finite beam size and deviations from a perfectly circular Herriott cell pattern. The drawback to increasing the slice number is more interface surfaces between them, which are likely to scatter light or refract it away from the detector. Assuming a 2 mm diameter beam size, and a Herriott spot pattern 45 mm in radius, ~5% of the rays should overlap the surface between two wedges in the eight-fold case. In alternative embodiments, a different number of slices may be used such as six, seven, nine, etc.

To demonstrate the improved efficiency that an optical element provides to an ICOS device, an actual optical element was manufactured and included eight slices. The manufactured slices had an error in their wedge gradient which ray tracing calculations suggest reduces capture efficiency to 91%, as depicted in FIG. 9C. Instead of pointing from corner to corner, the gradient points from corner to edge, leaving at most 0.8° of skew angle, corresponding to a maximum skew invariant of 0.63 mm. These components tend to introduce more divergence with a greater spread than the design version, and as a result, the spot pattern in the detector plane of FIG. 9C appears more diffuse than in the ideal case of FIG. 9B.

As noted above, FIG. 9A depicts a calculated spot pattern in a detector plane without use of an optical component in accordance with an illustrative embodiment. FIG. 9B depicts a calculated spot pattern in a detector plane with the use of an optical component as described herein in accordance with an illustrative embodiment. FIG. 9C depicts a calculated spot pattern in a detector plane for the manufactured optical component in accordance with an illustrative embodiment. The visible gray-shaded areas are those that intersect a 2 mm diameter detector. The collection efficiencies in the case of FIGS. 9A-9C are 13%, 93%, and 91%, respectively. These ray tracing calculations are done by approximating the laser beam by a bundle of 121 parallel rays with a diameter of 2 mm, then injecting them into the cavity in a Herriott configuration. The bundle is advanced over one complete cycle of the cell's Herriott pattern (622 passes), and at each point of intersection with the output mirror the rays are refracted through it and enter the collection optics. In alternative embodiments, a different method may be used to conduct the ray tracing calculations. FIG. 10 is a table depicting optical component dimensions for a proposed system in accordance with an illustrative embodiment. In FIG. 10, all dimensions are in mm. Additionally, D1, D2, D3, and D4 are the distances from the plano face of the cavity output mirror to the plano faces of the nonax optical component, PCX1, PCX2, and the detector, respectively.

Referring again to the manufactured embodiment, the 8 identical wedged slices used to create the optical element were formed from polycrystalline ZnSe, and were coated with an anti-reflective (AR) coating to less than 0.2% reflectivity. In alternative embodiments, a different reflectivity value may be used. Additionally, in the manufactured embodiment, all edges were beveled to prevent chipping. In one embodiment, the bevel at the vertex of each slice can be made larger to allow for some play in the assembly of the optical element. After manufacture and coating, the slices are assembled stepwise into the full optical component. The individual slices were bonded together with an adhesive such as Norland Optical Adhesive 83H by applying a small amount of adhesive to the faces to be attached, and curing for 60 minutes at 80° C. Good contact between the faces can be ensured by mounting the wedges in a circular aluminum form out of which a circular sector matching the parts to be bonded has been removed. The slices are pressed into place using a large band clamp that goes all the way around the aluminum form and slices. A strip of rubber can be placed between the band clamp and the slices to protect them.

Once the full disk of slices is assembled, it is placed into a custom mounting ring compatible with the ICOS device with which it is to be used. In the manufactured embodiment, the custom mounting ring was compatible with a 3-rail system on the detector side of ChiWIS ICOS device. To hold the component in place, several dots of epoxy are placed around the edge of each slice. The component mounting ring assembly is placed between the cavity mirror and the large PCX lens, as close as possible to the mirror.

Figure 11:
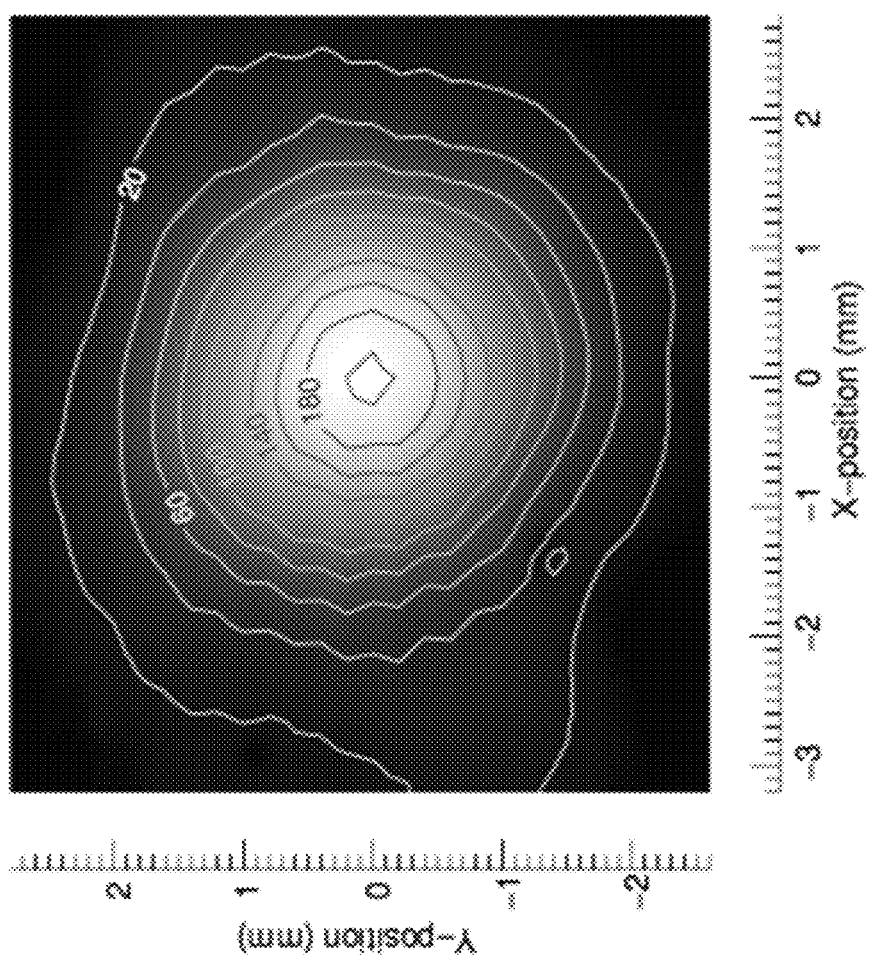
FIG. 11 is an intensity map of cavity output using an optical component in accordance with an illustrative embodiment.

By mapping the focused cavity output in the detector plane, it has been demonstrated that the non-axially-symmetric optical element described herein performs as expected to increase the efficiency of light collection. FIG. 11 is an intensity map of cavity output using an optical component in accordance with an illustrative embodiment. In FIG. 11, the X- and Y-coordinate systems are centered on the peak of the output feature. The output is plotted as a black-and-white intensity map with contours in millivolts overlaid. The observed intensity feature has full width of ~4.01 mm at $1/e^2$, but deconvoluting the detector shape shows the true width to be ~3.1 mm. As shown in FIG. 11, the output is peaked and centered on the optical axis, with a radius similar to that predicted by the ray tracing calculations of FIG. 9C. In the absence of the optical component, one would expect to see an intensity map that was the convolution between the circular detector shape and FIG. 9A, which is a smeared-out ring with a distinct intensity minimum at the center of the pattern.

Again referring to FIG. 11, the output is mapped in 200 micron increments over a 5.8 mm by 5.2 mm range by mounting an XYZ translation stage (e.g., Newport 460-XYZ) to the 3-rail mounting assembly on the instrument's detector side, and attaching a 2 mm Judson detector to the translation stage. Although the detector is comparable in size to the features to be mapped, it can easily distinguish the most important effects attributable to the optical component. Each point in FIG. 11 represents the total power collected by the detector when centered at that point. In other words, the intensity map is a convolution of the detector's shape and the true cavity output pattern. The data were taken in alternating positive/negative x-direction stripes, and the y-position was incremented between each stripe. Play in the translation stage's vernier dial introduced a discrepancy in the measured x-position between positive and negative stripes, which was corrected after the data were taken.

The observed output with the optical component is nearly Gaussian with a full width of ~4.01 mm at the $1/e^2$ points, confirming that it is effectively removing skew and allowing for maximum capture by the 2 mm detector. Deconvoluting the detector shape from the intensity map indicates that the true width of the output is ~3.1 mm at $1/e^2$, implying the detector captures about 75% of cavity output. Output radius is somewhat larger than the value of ~2.05 mm derived from ray tracing calculations, and efficiency smaller, probably due to a slightly elliptical Herriott cell pattern, which tends to smear the output for the same reasons as the finite beam size. Ray tracing simulations of an elliptical Herriott cell pattern with semiminor axis of 43.5 mm and semimajor axis of 46.5 mm yields a significantly more diffuse spot pattern at the detector plane in which only 70% of the cavity output is captured. The deconvolution procedure assumes that the detector face is a perfect circle of diameter 2 mm and that its response is uniform. The detector chip is cooled to ~−65° C., and should have nearly uniform response across its face at this temperature. If a 3 mm diameter detector is used at this wavelength, it would be able to capture more than 95% of the instrument's output using the optical component.

In another test, output spectra was measured with and without use of the optical component. The instrument was aligned with a Herriott spot pattern ~41 mm in radius for these tests. The spot pattern size was determined by placing apertures of various sizes in front of the cavity output mirror. This method also puts an upper bound of 25% on the mirrors' filling factor. The smaller pattern slightly increases the total power that can be collected, but reduces the contrast between cases with and without the optical component. Spectra were taken about thirty minutes apart using the same gas source.

Figure 12:
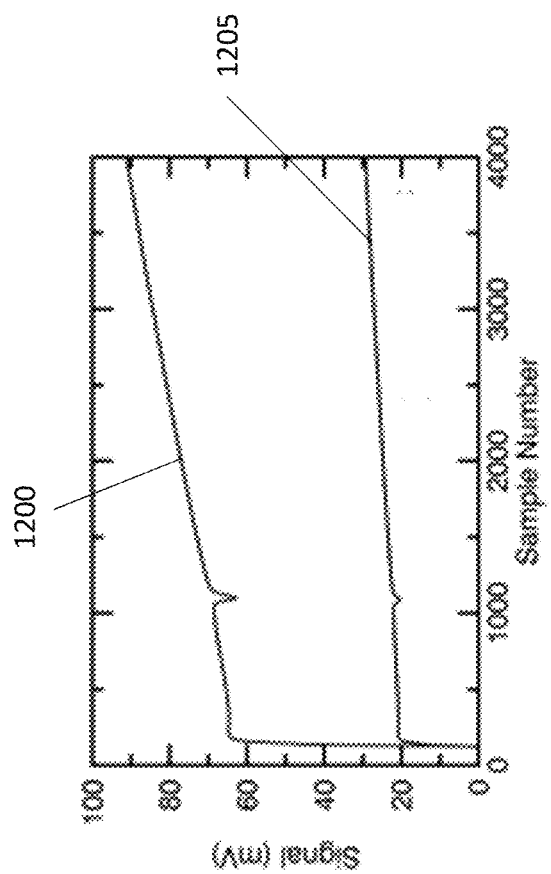
FIG. 12 depicts laboratory spectra taken with and without an optical component in place in accordance with an illustrative embodiment.

FIG. 12 depicts laboratory spectra taken with and without an optical component in place in accordance with an illustrative embodiment. A line 1200 depicts data obtained using the optical component, and a line 1205 depicts data obtained without the use of an optical component in the system. The spectral feature at sample 1000 is the strong water line at 3777.9492 $cm^{-1}$. Measured one-sigma noise is not significantly changed by the optical component's introduction and remains nearly constant in the range of 19-20 $\mu V/\sqrt{Hz}$. Specifically, one-sigma noise is 20 $\mu V/\sqrt{Hz}$ with the optical component and 19 $\mu V/\sqrt{Hz}$ without the optical component. The minimum detectable absorption per scan ($MDA_{ps}$) is $2.5 \times 10^{-4}$ $Hz^{-1/2}$ with the optical component, and $7.6 \times 10^{-4}$ $Hz^{-1/2}$ without it. These noise numbers are inclusive of electrical and optical noise, and show that the optical component does not introduce excess fringing into the spectra. The component improves the system's signal-to-noise ratio by about a factor of 3.1.

No other optical or mechanical effects of the optical component were identified that would limit performance. The proposed optical component introduces no fringing into observed spectra, and optical noise in the system as a whole is much lower than electrical noise. The assembly process described herein results in strong bonds between the wedges themselves and between the wedges and their mount. This optical component was field-tested during a monsoon field campaign, where it was used in eight flights aboard a high-altitude research aircraft, and required no repair or modification after these flights.

Thus, the optical component described herein is a straightforward, non-axially symmetric optical component that can be used to increase the collection efficiency of large ICOS instruments by a factor of six. This optical component removes enough of the native skewness of cavities aligned in a Herriott pattern that most of the cavity output can be focused down onto a commercially available detector. This method can be generalized to any material and applied to cavities of any size. It is noted that axial symmetry in an ICOS cavity can also be broken by the use of astigmatic cell mirrors, but such output is subject to its own constraints, and astigmatism may offer little improvement to collection efficiency. Conversely, the non-axial component described here provides an effective and robust method of increasing collection efficiencies.

The methods described herein can be generalized to any material and applied to cavities of any size. In one embodiment, the optical elements described here are made of ZnSe to minimize transmission losses at 2.6 microns. In alternative embodiments such as instruments operating in wavelength regions less susceptible to absorption by OH bonds or other impurities, the optical component could be manufactured out of inexpensive and easily machinable optical materials. Optical glasses typically have indices of refraction around 1.5, so designs using these materials can use larger wedge angles to correct for the same amount of skewness. For example, to correct the ChiWIS skewness using BK7 (n≈1.48), a wedge angle of 5.44° can be used, resulting in a difference in thickness of about 3.3 mm across the part, which is about twice that of the ZnSe design. Wedges with angles of about 5° are well within the capabilities of most optics manufacturers.

It is noted that the relationship between cavity geometry and skewness (derived herein), shows that the skew angle γ and concentration factor h/A are completely determined by the dimensionless cavity geometry numbers u=f/d and v=A/d. These numbers provide a convenient way to compare the geometries of different instruments, and to gauge susceptibility of a design to having a large skew invariant. It has also been shown that skew angles are most sensitive to the cavity aspect ratio v and that in practice, ICOS instrument designs have clustered around similar v, meaning that skewness constraints scale with instrument size.

In the present generation of ICOS instruments, skewness constraints are most significant in longer-wavelength instruments, which have larger beam spot sizes ($\lambda^{1/2}$) and therefore require larger cavity mirrors to separate spots on the cavity mirrors by several spot diameters to avoid optical resonance effects. In the future, skewness may become a more widespread concern as instruments are miniaturized while mirror size remains constrained by optical considerations. Use of ICOS in low sample volume applications such as breath analyzers, fast samplers with rapid flush times, lightweight instruments for unmanned aircraft and field-portable sensors all may warrant use of non-axial components designed to increase collection efficiency.

In an illustrative embodiment, any of the calculations and/or operations described herein can be performed by a computing device that includes a processor, a memory, a transceiver, and/or a user interface. The memory of the computing device can be used to store computer-readable instructions corresponding to the calculations/operations described herein. The processor, which is coupled to the memory, is configured to execute the computer-readable instructions to perform the calculations and operations. The transceiver allows the computing device to communicate with other devices, and the user interface (e.g., display, mouse, keyboard, ports, etc.) allows a user to interact with the computing device.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An integrated cavity output spectroscopic (ICOS) device comprising:
   a cavity;
   a mirror positioned at an output end of the cavity;
   a first collection lens positioned between a detector and the mirror at the output end of the cavity;
   a second collection lens positioned between the first collection lens and the detector; and
   a non-axially symmetric optical component configured to reduce skew of an optical signal output from the cavity, wherein the non-axially symmetric optical component is positioned between the mirror and the first collection lens.

2. The ICOS device of claim 1, wherein the non-axially symmetric optical component comprises a plurality of slices mounted to one another in a circular pattern.

3. The ICOS device of claim 2, wherein the plurality of slices comprises eight slices.

4. The ICOS device of claim 2, wherein each slice in the plurality of slices is made from zinc selenide (ZnSe).

5. The ICOS device of claim 2, wherein edges of the slices are mounted to one another such that there is a step at each interface between the slices.

6. The ICOS device of claim 5, wherein the edges of the slices are beveled.

7. The ICOS device of claim 2, wherein a gradient of a first surface of a slice points from a first corner of the slice to a second corner of the slice along a cross-section of the slice to form a wedge-shaped surface.

8. The ICOS device of claim 7, wherein a second surface of the slice is plano.

9. The ICOS device of claim 2, wherein each of the slices is formed to have a wedge angle ß to refract skew out of the optical signal.

10. The ICOS device of claim 1, further comprising a mounting ring configured to hold the non-axially symmetric optical component in place.

11. The ICOS device of claim 1, wherein the first collection lens and the second collection lens comprise plano-convex collection lenses.

12. The ICOS device of claim 1, further comprising a laser and the detector.

13. An optical component for use in an ICOS device, the optical component comprising:
    a plurality of slices mounted to one another in a circular pattern, wherein edges of the slices are mounted to one another such that there is a step at each interface between the slices;
    wherein a first surface of a slice is wedge-shaped such that a gradient of the first surface of the slice points from a first corner of the slice to a second corner of the slice along a cross-section of the slice, and wherein a second surface of the slice is wedge-shaped or plano; and
    wherein each of the slices is formed to have a wedge angle ß to refract skew out of an optical signal received by the optical component.

14. The optical component of claim 13, wherein the plurality of slices comprises eight slices.

15. The optical component of claim 13, wherein each slice in the plurality of slices is made from zinc selenide (ZnSe).

16. The optical component of claim 13, wherein the edges of the slices are beveled with a bevel that is 0.25 millimeters (mm) or less.

17. The optical component of claim 13, further comprising an anti-reflective coating applied to each slice in the plurality of slices.

18. The optical component of claim 13, further comprising an adhesive to mount the plurality of slices to one another.

* * * * *